July 22, 1952 R. M. SEDDON ET AL 2,604,336
ADJUSTABLE REAR WHEEL SUSPENSION SYSTEM FOR MOTORCYCLES
Filed May 15, 1951 2 SHEETS—SHEET 1
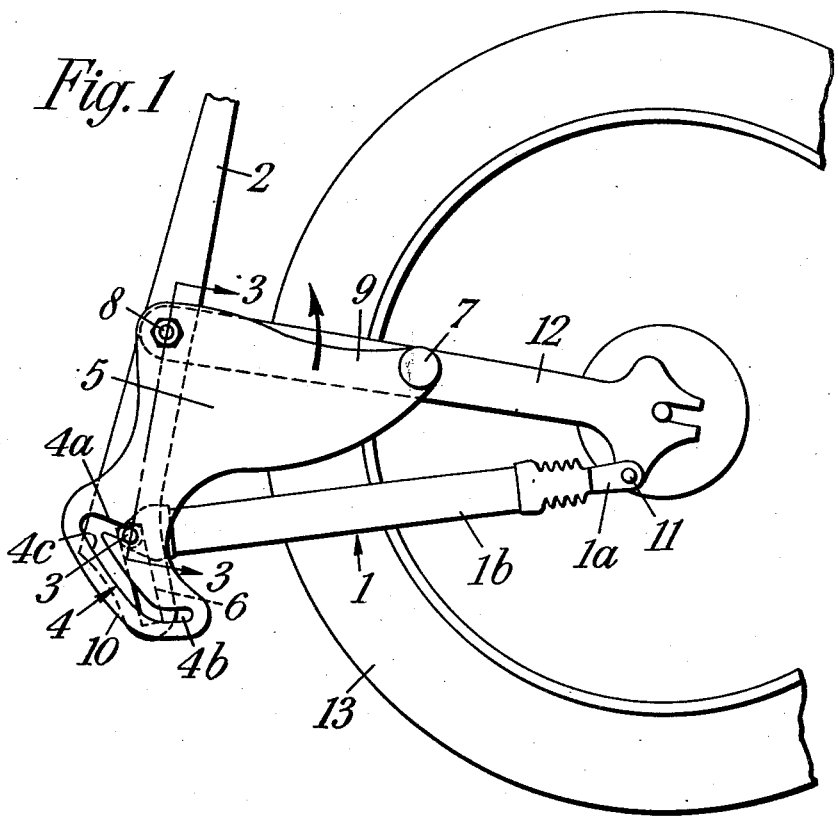
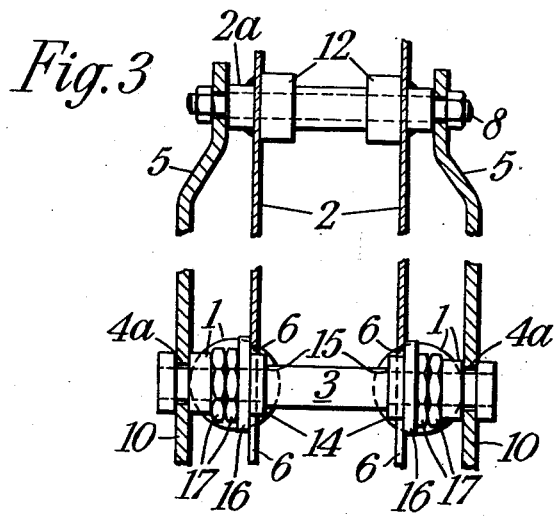
INVENTORS
Robert Maxwell Seddon
John Carlton Mathews
by Benj. T. Rauber
their attorney July 22, 1952   R. M. SEDDON ET AL   2,604,336
ADJUSTABLE REAR WHEEL SUSPENSION SYSTEM FOR MOTORCYCLES
Filed May 15, 1951   2 SHEETS—SHEET 2
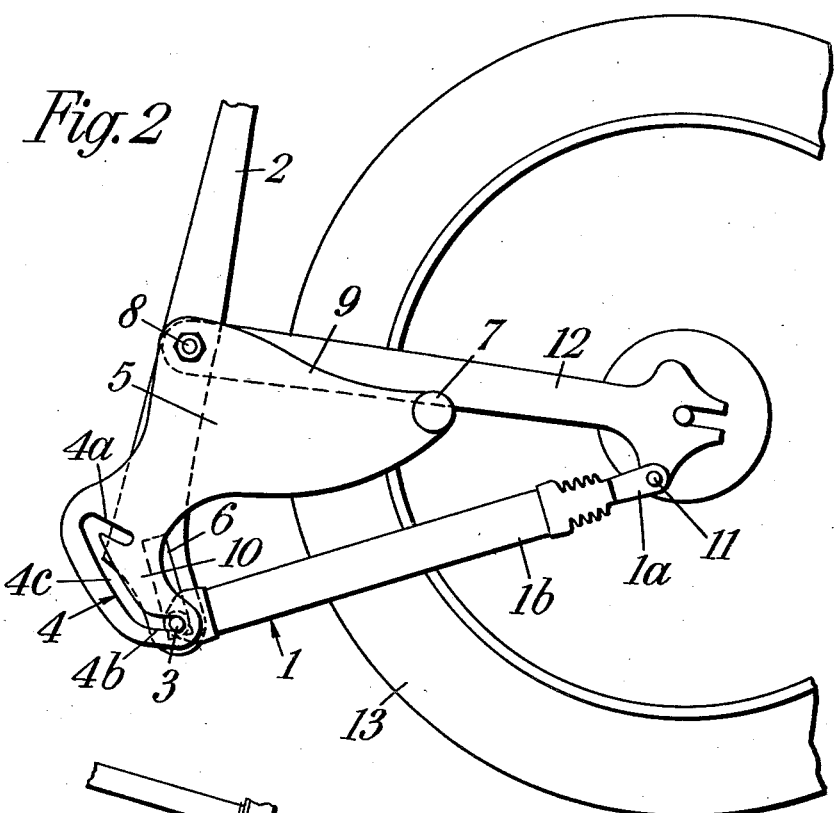
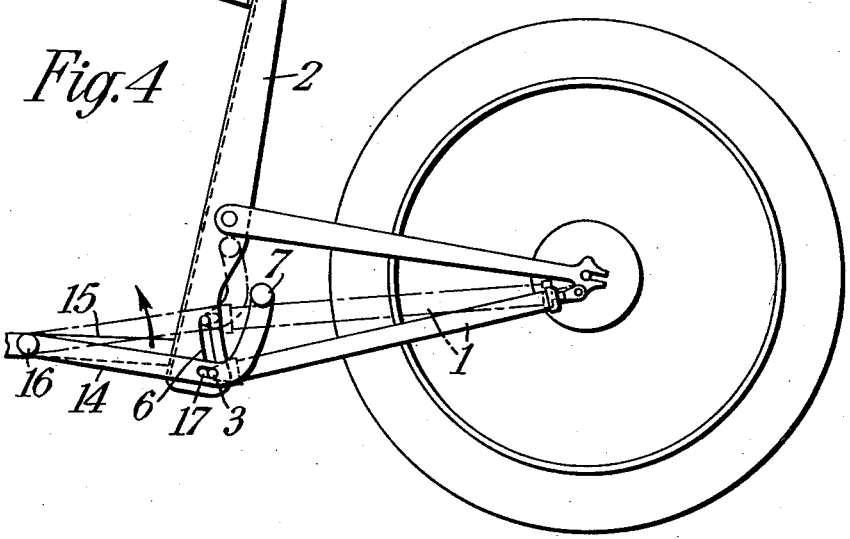
INVENTORS
Robert Maxwell Seddon
John Carlton Mathews
by Benj. T. Rauber
their attorney Patented July 22, 1952

2,604,336

UNITED STATES PATENT OFFICE 2,604,336

ADJUSTABLE REAR WHEEL SUSPENSION SYSTEM FOR MOTORCYCLES

Robert Maxwell Seddon, Walmley, Sutton Coldfield, and John Carlton Mathews, Harborne, Birmingham, England, assignors to Dunlop Rubber Company Limited, London, England, a British company Application May 15, 1951, Serial No. 226,448
In Great Britain May 17, 1950

5 Claims. (Cl. 280—284)

This invention relates to rear wheel suspension systems for motor cycles and is an improvement in or modification of the invention forming the subject-matter of patent application of Robert Maxwell Seddon, Ser. No. 113,046, filed August 30, 1949.

In this application there is described a resilient suspension system for the rear wheel of a motor cycle in which the rear fork member of the motor cycle is pivotally attached to the rear frame member and shock absorbers are pivotally attached at one end to the rear frame member below the point of attachment of the fork member, and at the other end to the ends of the fork member remote from the rear frame member.

When a pillion passenger is mounted on a motor cycle the load on the rear wheel is increased and the distribution of the load with respect to the rear wheel suspension is changed as compared with the load distribution without a passenger.

It is an object of this invention to provide a resilient rear wheel suspension system of the above-mentioned kind which can be adjusted in accordance with the amount and distribution of the load.

According to the invention a motor cycle having a resilient rear wheel suspension system comprises a fork member pivotally attached at one end to a downwardly extending frame member, said fork member having two arms upon which the rear wheel is mounted, a pair of shock absorbers each having co-axial inner and outer elements axially movable with respect to each other and each having one element pivotally attached to an arm of the fork member adjacent to the wheel hub and an actuating member pivotable about the frame and providing alternative locations for the ends of the outer shock absorber elements below the point of attachment of the fork member to the frame whereby the angle between the fork member and the shock absorbers can be adjusted.

The pivotally mounted actuating member may comprise a cam plate having a slot formed therein for engaging a spindle carrying the shock absorbers whereby movement of the plate is adapted to move the spindle within a slot formed in the downwardly extending frame member from one location to another.

Preferably, however, the cam plate is provided with a slot having a cam portion for moving the spindle and guiding portions at each end of the cam portion for guiding the spindle clear of the cam portion so as to prevent movement of the spindle in the slot formed in the downwardly extending frame member.

The invention will now be described with reference to the accompanying drawings in which—

Figure 1 represents a side elevation of one embodiment of the invention with the wheel suspension adjusted into a position wherein it is suitable for withstanding the weight of a sole rider.

Figure 2 represents a side elevation of a rear wheel suspension system adjusted into position wherein it is suitable for supporting the weight of a solo rider and pillion passenger.

Figure 3 is a cross-sectional side elevation along the line 3—3 shown in Figure 1.

Figure 4 is a side elevation of an alternative embodiment.

One embodiment of the invention as shown in Figures 1, 2 and 3 will now be described. The suspension system is of the kind already referred to and the position of the spindle 3, attaching a pair of shock absorbers 1 to a channel-shaped frame member 2, is adjusted by means of cam slots 4 formed in a pair of pivoted cam plates 5, each having a foot rest 7 attached thereto. The cam plates 5 are adjusted by means of foot rests 7 so as to move the spindle 3 in a slot 6 as will be more particularly described hereinafter.

The cam plates 5 are pivotally mounted one on each side of the frame member 2 by means of a common pivot 8 to which the plates are keyed. The pivot 8 is freely rotatable in bushes 2a attached to the frame member. Each cam plate 5 is provided with two arms 9 and 10, the arm 9 carrying the foot rest 7 and the arm 10 having the cam slot 4 formed therein. Each cam slot 4 comprises an arcuate cam portion 4c for moving the spindle 3 in the slot 6, an arcuate guiding portion 4a formed obtusely at one end of the portion 4c, the radius of the arcuate portion 4a having the pivot 8 as its centre, and an arcuate guiding portion 4b formed acutely at the other end of the portion 4c, the radius of the portion 4b also having the pivot 8 as its centre. The guiding portions 4a and 4b serve to guide the spindle 3 clear of one end or the other of the cam portion 4c as will be more fully described hereinafter.

A pair of shock absorbers are pivotally mounted by means of pivots 11 one to each arm of the fork member 12 which supports the back wheel 13. Preferably the shock absorbers are those shown in Patent No. 2,574,420. Each shock absorber 1 comprises coaxial inner and outer members 1a and 1b relatively movable axially so as to compress an annular rubber element mounted on the inner member whether the shock absorber is extended or contracted. The other end of each shock absorber is mounted on the spindle 3 (see Figure 3) which is provided with bushes 14 each having a pair of parallel sides which are slidable on the sides of one of the slots 6 formed in each flange of the channel-shaped frame member 2. Each bush abuts a shoulder 15 formed on the spindle 3. A collar 16 is located on the spindle adjacent to each bush 14, the collars bearing on the surface of the frame member 2 and serving to prevent tipping of the spindle 3 during adjustment with consequent jamming of the spindle in the slot 6. The collars 16 are held in position by means of locknuts 17.

The operation of the adjustable rear suspension system just outlined will now be described. If it is required to change the setting of the adjustable suspension system from a position as shown in Figure 1, wherein the system is adjusted for solo riding, to a position shown in Figure 2 suitable for carrying a pillion passenger, the foot rests 7 are gripped by hand and rotated in a direction shown by the arrow—see Figure 1—so that the plates 5 move relative to the spindle 3. The spindle 3 moves along the portion 4a of the cam slots 4 until it is located at the junction of the portions 4a and 4c of the cam slots. The weight of the shock absorbers will then cause the spindle 3 to move into engagement with the portions 4c of the cam slots. The cam plate is then rotated in a direction opposite that shown by the arrow in Figure 1 so that the spindle is moved by the portion 4c of each cam slot, the spindle and bushes 14 being moved thereby down the slot 6 until they take up a position at the bottom of the slot 6. Further rotation of the cam plates 5 causes the cam plates to move relative to the spindle so that the spindle engages the portion 4b of each of the cam slots, which serve to lock it in position at the bottom of the slot 6.

The shock absorber is thus adjusted and secured in a position (see Figure 2) relative to the fork member 12 wherein the rear suspension system is capable of adequately supporting a pillion passenger.

In order to revert the shock absorber to its original position, the reverse procedure is carried out, the portions 4a of the cam slots 4 serving to lock the spindle 3 in its upper position in the slot 6 (see Figure 1).

In an alternative embodiment illustrated in Figure 4, the position of a spindle 3 and a pair of shock absorbers 1 attached thereto is adjusted by means of a pair of L-shaped levers 14, each lever being rigidly attached at one end to a spindle 16 pivotally mounted on the horizontally extending frame member 15. A foot rest 7 is attached to the end of each lever at its end remote from the spindle 16. A slot 17 is provided in each lever 14 within which the spindle 3 slides when it is adjusted from one position to the other along the slot 6. Each end of the spindle 3 is screwthreaded and provided with a clamping nut—not illustrated in the drawings—which serves to retain the spindle 3, and hence the shock absorbers 1, in the upper or lower position. The operation of the system just outlined will now be described.

The L-shaped levers 14 and the shock absorbers 1, as illustrated in Figure 4 by the full lines, show the suspension system suitably adjusted for supporting the weight of a pillion passenger. In this position the pillion passenger's feet will be resting on the foot rest 7 and thus forcing the spindle 3 into its lower position in the slot 6. When it is desired to adjust the suspension system so as to make it suitable for supporting only a solo rider, the clamping nuts are loosened and the lever 14 is moved into the position (shown chain-dotted in Figure 4) wherein the spindle 3 is moved to the top end of the slot 6. This is effected by rotating the lever 14, in the direction shown by the arrow in Figure 4, so that the spindle 3 slides in the slot 6 into the upper position. The clamping nuts are then tightened up so as to retain the levers 14 and the shock absorbers 1 in position.

Having described our invention, what we claim is:

1. A motor cycle having a resilient rear wheel suspension system comprising a downwardly extending frame member, a fork member pivotally attached at one end to said downwardly extending frame member, said fork member having two arms upon which the rear wheel is mounted, a pair of shock absorbers each having co-axial inner and outer elements axially movable with respect to each other and each having one element pivotally attached to an arm of the fork member adjacent to the wheel hub, the ends of the other shock absorber elements being mounted on a common spindle movable in a slot formed in the downwardly extending frame member below the point of attachment of the fork member thereto, and an actuating member pivotable about the frame and engageable with the spindle so as to move the shock absorbers whereby the angle between the fork member and the shock absorbers can be adjusted.

2. A motor cycle having a suspension system according to claim 1 wherein the pivotally mounted actuating member comprises a cam plate having a footrest attached thereto and having a slot formed therein for actuating the spindle whereby movement of the plate is adapted to move the spindle and shock absorbers from one location to another.

3. A motor cycle having a suspension system according to claim 2 wherein the slot is provided with a cam portion for moving the spindle and a guiding portion at each end of the cam portion for guiding the spindle clear of the cam portion.

4. A motor cycle having a suspension system according to claim 1 wherein the pivotally mounted actuating member comprising a lever having a footrest attached thereto adjacent to its free end, the said lever engaging the spindle whereby movement of the lever is adapted to move the spindle and shock absorbers from one location to another.

5. A motor cycle having a resilient rear wheel suspension system comprising a downwardly extending frame member, a fork member pivotally attached at one end to said downwardly extending frame member above the lower end thereof, said fork member having two arms to mount a rear wheel, said downwardly extending frame having a slot extending downwardly below the point at which said fork member is pivotally attached onto said downwardly extending member, a pair of shock absorbers each having co-axial inner and outer elements axially movable with respect to each other and each having one element pivotally attached to an arm of the fork member adjacent to the place for mounting a wheel, the ends of the other shock absorber elements being mounted on a common spindle movable upwardly and downwardly in said slot to vary the leverage on said shock absorber and means to locate said common spindle at selected positions in said slot.

ROBERT MAXWELL SEDDON.
JOHN CARLTON MATHEWS.

REFERENCES CITED

The following references are of record in the file of this patent:

UNITED STATES PATENTS

| Number | Name | Date |
|---|---|---|
| 1,934,670 | Hickman | Nov. 7, 1933 |

FOREIGN PATENTS

| Number | Country | Date |
|---|---|---|
| 18,030 | Great Britain | of 1897 |